Figure 1:
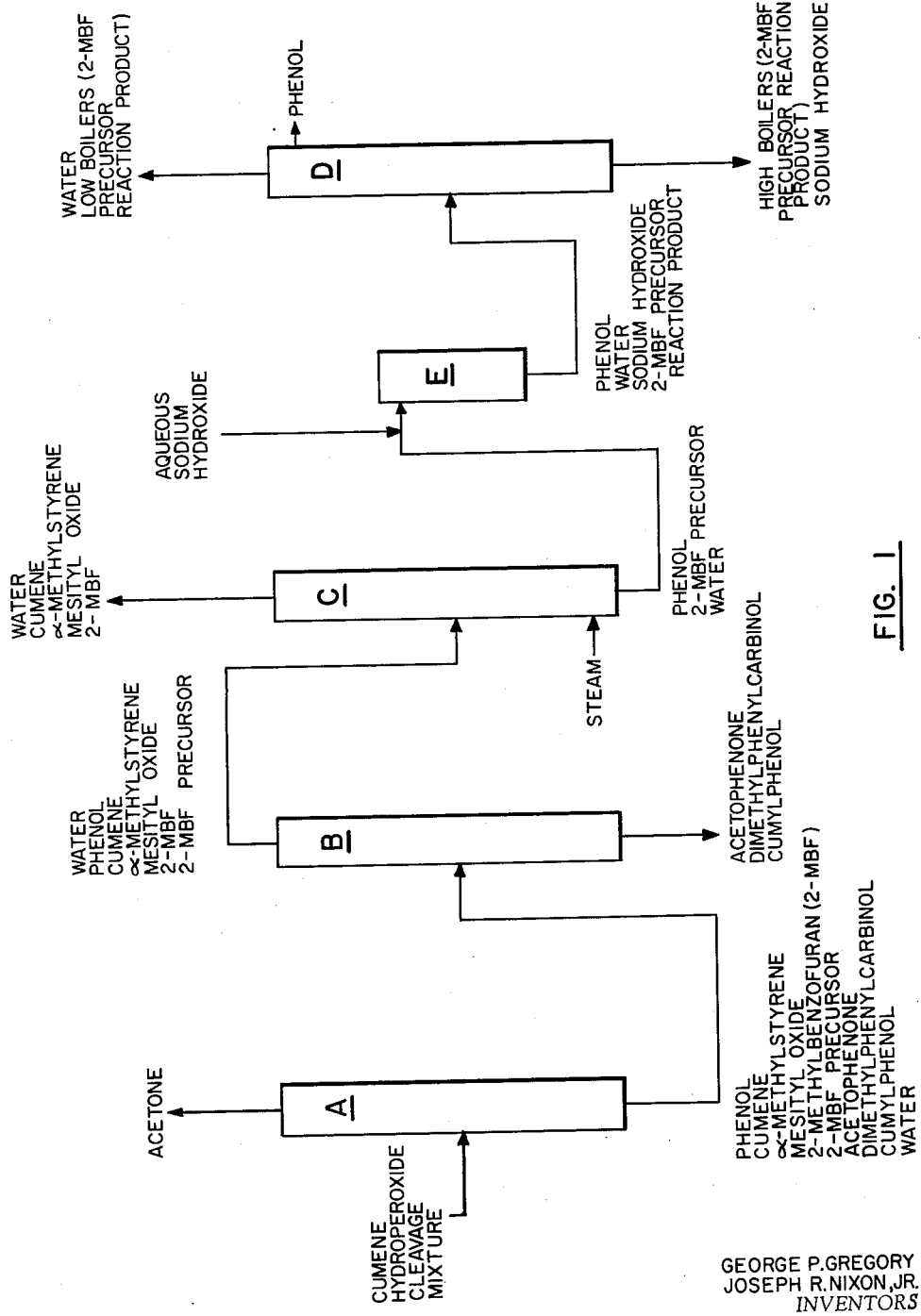

GEORGE P. GREGORY
JOSEPH R. NIXON, JR.
INVENTORS

GEORGE P. GREGORY
JOSEPH R. NIXON, JR.
INVENTORS

GEORGE P. GREGORY
JOSEPH R. NIXON, JR.
INVENTORS

BY Ernest G. Peterson
AGENT

United States Patent Office 2,992,169
Patented July 11, 1961

2,992,169
PHENOL PURIFICATION
George P. Gregory, Wilmington, Del., and Joseph R. Nixon, Jr., Pitman, N.J., assignors to Hercules Powder Company, Wilmington, Del., a corporation of Delaware
Filed Aug. 28, 1959, Ser. No. 836,591
9 Claims. (Cl. 202—57)

This invention relates to the purification of phenol, and more particularly to the purification of phenol obtained by oxidation of cumene and subsequent cleavage of the hydroperoxide produced.

When cumene hydroperoxide is cleaved by contacting it with acidic catalysts such as sulfuric acid and acid-treated clays, the cleavage mixture contains phenol and acetone as the principal products. However, the mixture also contains α-methylstyrene, acetophenone, dimethylphenylcarbinol and cumylphenol as by-products, and it may contain some unreacted cumene.

The components of the cleavage mixture are preferably recovered therefrom by fractional distillation. Fundamentally, the distillation results in obtaining an acetone fraction, a phenol fraction and a residue comprising cumylphenol. In more detail, the distillation may be carried out to obtain a first fraction comprising acetone, a second fraction comprising α-methylstyrene, any unreacted cumene, if present, and water, a third fraction comprising phenol, and a residue comprising acetophenone, dimethylphenylcarbinol, cumylphenol and some resinous matter formed by polymerization of α-methylstyrene. Alternatively, the cumene and α-methylstyrene may be collected with the acetone fraction or the phenol fraction and separated therefrom by subsequent distillation. In any event, the phenol fraction is a crude phenol which must be subjected to further distillation for purification purposes.

The distillation procedures described above may be operated batchwise, but are more conveniently carried out on a continuous basis in a series of columns, the various fractions being obtained as overhead materials. The crude phenol fraction so obtained may then be distilled either continuously or in a batchwise operation to purify it. When operating batchwise, the crude phenol is stored and periodically removed from the storage tank for charging to the batch still.

Early in the development of suitable distillation techniques for the isolation of pure phenol from cumene hydroperoxide cleavage mixtures it was found that the product phenol, although otherwise pure and meeting standard specifications, contained certain genetic impurities which were usually present in only minute amounts, but which were of such a nature that the phenol containing them developed an undesired red color when subjected to chlorination with elementary chlorine and also developed an unwanted reddish amber color when sulfonated with concentrated sulfuric acid. These impurities obviously were not separable from the phenol by ordinary fractional distillation, and their presence effectively prevented complete purification of the phenol by this procedure alone.

The nature of the genetic impurities and a process of removing them now have been discovered. The genetic impurities include mesityl oxide, compounds which are α-diketones, such as biacetyl, compounds which are partial hydrogenation products of α-diketones or α-ketoaldehydes, such as acetoin and hydroxyacetone, and compounds which are alkyl-substituted benzofurans, such as 2-methylbenzofuran. Of the specific impurities listed above, mesityl oxide and biacetyl were the first to be identified, and they were found to be inseparable from phenol by ordinary fractional distillation. Identification of the 2-methylbenzofuran impurity was next and was difficult, but after the identification had been accomplished, several additional findings were made, namely, that the compound could not be separated from phenol by ordinary fractional distillation, that it was steam-volatile and separable from phenol by fractional steam distillation, and that it was formed by reaction between phenol and biacetyl, one of the previously known genetic impurities. Furthermore, it was found that biacetyl was not the only precursor to 2-methylbenzofuran, and it also become apparent that there were other alkyl-substituted benzofurans, the alkyl substituents being in the furan ring, which should give rise to undesirable coloration on chlorination of phenol obtained by cumene hydroperoxide cleavage.

The overall findings may now be generalized. Discoloration on chlorination of cumene hydroperoxide phenol occurs primarily due to the presence therein of one or more alkyl-substituted benzofurans, such as 2-methyl-, 3-methyl- and 2-isopropylbenzofuran. The alkyl-substituted benzofurans are those compounds which are benzofuran substituted by one alkyl substituent in the furan ring, either at the 2- or 3-position. The alkyl group will contain between one and about nine carbon atoms. Ordinarily, six carbon atoms will be a maximum, and most of the substituted benzofurans will contain either one-carbon or three-carbon alkyl substituents. Nevertheless, discoloration also is contributed to by mesityl oxide and one or more of the precursors of the alkyl-substituted benzofurans. These precursors are compounds such as biacetyl, hydroxyacetone, 4-methyl-2-3-pentanedione, and acetoin. In turn, the hydroxyacetone may be formed by partial hydrogenation of methylglyoxal, which is an α-ketoaldehyde, and the 4-methyl-2,3-pentanedione may be formed by hydrogenation of the carbon-carbon double bond in mesityl oxide and oxidation of the resulting methyl isobutyl ketone. Similarly, the acetoin may be formed by partial hydrogenation of biacetyl, which is an α-diketone. The α-diketones and the partial hydrogenation products thereof and of α-ketoaldehydes are all comparatively low molecular weight compounds containing no more than about twelve, and usually no more than about nine, carbon atoms. The α-diketone and α-ketoaldehyde partial hydrogenation products are those wherein one of the keto groups in the diketones and the aldehyde group in the ketoaldehydes have been reduced to the corresponding alcohol groups, thus giving α-ketoalcohols as products.

The process of this invention is one comprising the particular combination of steps involving contacting a phenol, containing the genetic impurities, in the liquid phase with a reagent consisting essentially of a base or an aqueous solution thereof, maintaining said reagent in contact with said phenol at a temperature in the range of about 20° C. to about 250° C. for at least about 0.25 hour to effect reaction of the alkyl-substituted benzofuran precursors whereby the latter are converted into products which are separable from the phenol, fractionally steam distilling the phenol either before or after treatment with the basic reagent to effect removal of the previously formed alkyl-substituted benzofurans, and finally subjecting the treated phenol to fractional distillation to recover a phenol which has been purified to the extent of substantial removal of the genetic impurities.

The purification process of this invention therefore constitutes an improvement in the method for the recovery of phenol by fractional distillation from the mixture produced by cleavage of cumene hydroperoxide, which mixture comprises acetone and phenol as principal components. The improvement comprises the steps of subjecting a cumene hydroperoxide cleavage mixture to fractional distillation to remove acetone and high boiling material composed primarily of acetophenone, dimethylphenolcarbinol and cumylphenol, thus producing a predominantly phenol-containing fraction, which fraction contains genetic impurities comprising mesityl oxide and alkyl-substituted benzofuran and at least one precursor of said alkyl-substituted benzofuran. This fraction or any subsequent comparable material is then subjected to the combination of steps involving efficient fractional steam distillation to remove previously formed alkyl-substituted benzofurans, and contacting the phenol material in the liquid phase with a reagent consisting essentially of a material selected from the group consisting of a base and an aqueous solution thereof, and maintaining said reagent in contact with said phenol material at a temperature in the range of about 20° C. to about 250° C. for at least about 0.25 hour to effect conversion of the alkyl-substituted benzofuran precursors into products which are separable from phenol by distillation, and finally subjecting to fractional distillation the phenol which has been both fractionally steam distilled and treated with the basic reagent, whereby a pure phenol substantially free of genetic impurities is obtained.

In other words, the improvement of this invention involves treatment with the prescribed reagents of any predominantly phenol-containing material existing in the distillative recovery system after the acetone and the high boiling material composed primarily of acetophenone, dimethylphenylcarbinol and cumylphenol have been removed from the cleavage mixture. The predominantly phenol-containing material may be illustrated by the overhead crude phenol separated from higher boiling materials such as acetophenone and cumylphenol, by the phenol stored prior to final batch distillation, and by the final product phenol isolated by batch or continuous distillation. These are all descriptive of materials obtainable in a substantially continuous distillation system, involving a series of columns, but comparable or related materials obtained by batchwise fractionation also may be treated. All of these materials may be defined as impure phenols to the extent that they contain genetic impurities as hereinbefore described.

The process in accordance with this invention is more particularly described in the following examples. In this specification all parts and percentages are by weight. The process of Example 1 is further illustrated by the flow sheet set forth in FIG. 1, wherein A, B, C and D represent distillation columns and E represents a tank in which the phenol containing 2-methylbenzofuran precursor is maintained in contact with aqueous sodium hydroxide.

Figure 2:
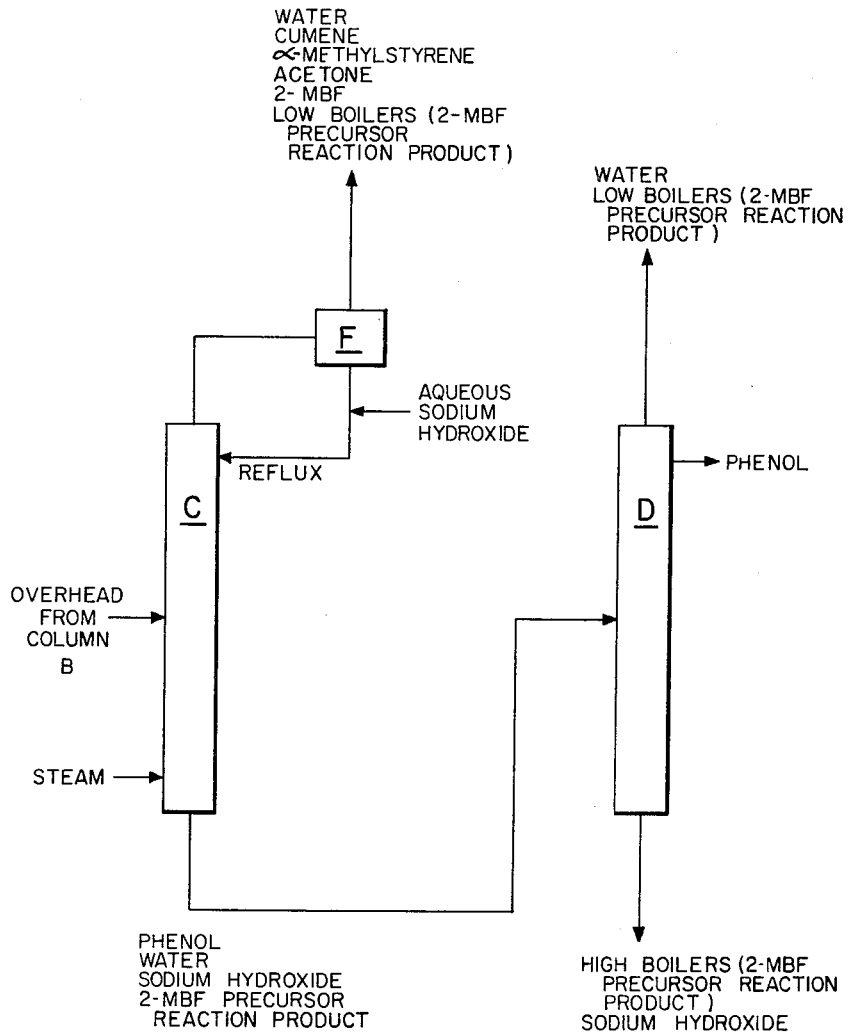
Figure 3:
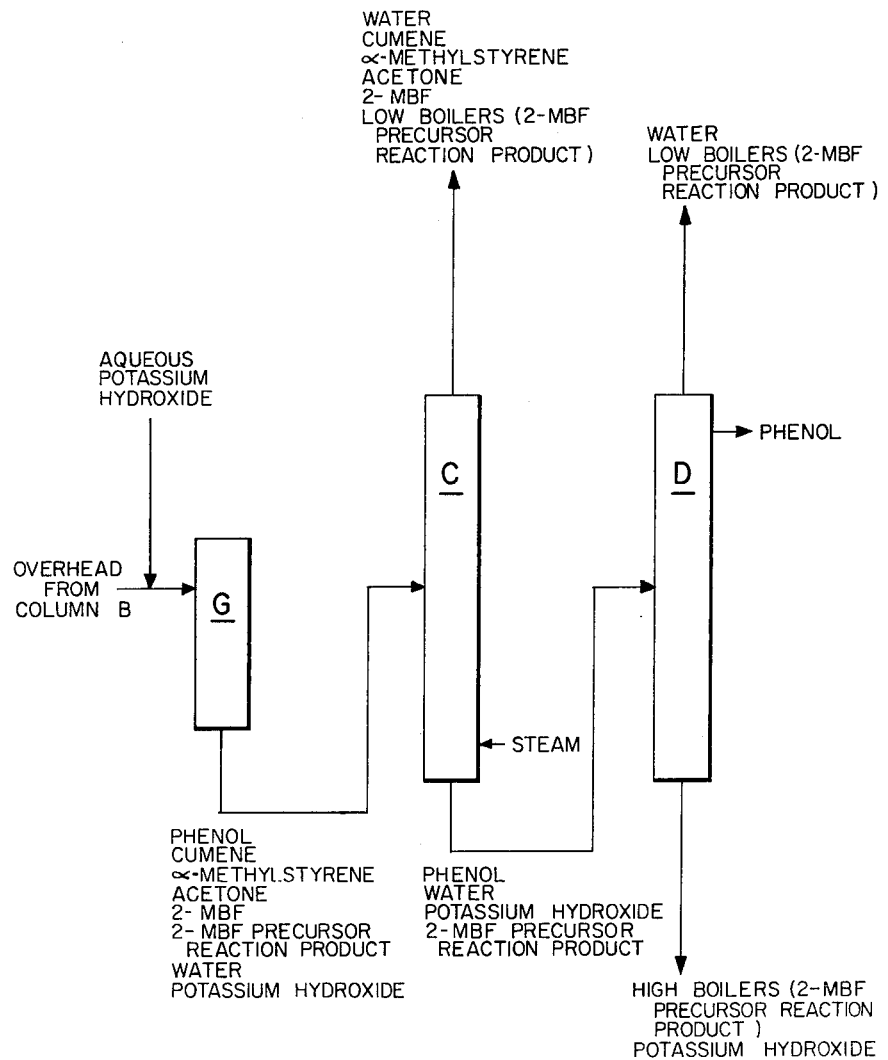

Similarly, the processes of Examples 2 and 3 are shown in the flow sheet illustrated in FIG. 2, wherein like pieces of apparatus have the same designation as in FIG. 1 and wherein F represents the well-known condensation and separation system used to handle a distillation column overhead and provide reflux to the column. The procedure of Example 4 is set forth in FIG. 3, where again like pieces of apparatus have the same designation as in FIG. 1 and where G represents a tank in which the phenol containing 2-methylbenzofuran precursor is subjected to treatment with aqueous potassium hydroxide.

EXAMPLE 1

Cumene was oxidized to the hydroperoxide and the hydroperoxide was subjected to acid cleavage. The acid catalyst in the cleavage mixture was neutralized and the mixture was separated from the products of the neutralization reaction. The neutralized cleavage mixture was subjected to fractional distillation in a series of columns. In the first column (A), acetone was taken overhead, leaving as bottoms product a mixture of phenol, some cumene and α-methylstyrene, and a high boiling material composed primarily of acetophenone, dimethylphenylcarbinol and cumylphenol. This bottoms product was separated in the next column (B) into an overhead crude phenol fraction and a high boiling residue.

The crude phenol fraction contained approximately 1500 parts per million of 2-methylbenzofuran (2-MBF), as determined by ultraviolet analysis, and it was subjected to efficient fractional steam distillation in a third column (C). Overhead azeotropes of water with α-methylstyrene, cumene and 2-MBF were removed by the distillation, leaving a crude phenol bottoms product containing substantially no 2-MBF. To the crude phenol bottoms product then was added sufficient aqueous 20% sodium hydroxide to adjust the pH to 7.0, this requiring 0.33% sodium hydroxide per se based on the weight of crude phenol treated, and the resulting mixture was maintained (in tank E) at a temperature of 108° C. for 90 hours.

The treated phenol then was fractionally distilled at a pressure of 200 mm. of Hg absolute at the top of the column (D) and at a pot temperature maintained between 143° and 152° C. The overhead phenol product contained 12 p.p.m. of 2-MBF and the several cuts taken for analytical purposes were each chlorinated according to the chlorination test set forth hereinafter. The cuts showed a range of 1.0 to 1.34 absorbance units at 510 m$\mu$ and a range of 0.98 to 1.33 absorbance units at 540 m$\mu$. The effectiveness of the treatment with sodium hydroxide is established by the fact that very little additional 2-MBF was formed in the phenol and by the fact that there was no substantial discoloration in the chlorinated phenol as measured at 510 m$\mu$. Further evidence was found in the fact that the overhead phenol product from the final distillation upon treatment with ferric chloride did not result in formation of any additional 2-MBF. (As shown in copending application Serial No. 738,622 by J. R. Nixon, filed May 29, 1958, ferric chloride catalyzes the reaction of phenol with 2-MBF precursors to form 2-MBF.)

EXAMPLE 2

The general procedure of Example 1 was followed except that the pH of the crude phenol bottoms product from the fractional steam distillation carried out in the third column (C) was adjusted to 7.0 by adding aqueous 50% sodium hydroxide to the column reflux (from condensation and separation system F) during the steam distillation, and the bottoms product then was subjected to the final fractional distillation without any substantial intermediate and separate period of maintaining the sodium hydroxide in contact with the phenol. The necessary period of contact took place during the time required to carry out the steam distillation.

The treated phenol, upon fractional distillation at a pot temperature of 144–151° C. and a pressure of 200 mm. of Hg absolute at the top of the column (D), gave an overhead product phenol containing 7 p.p.m. of 2-MBF and which had a color of 1.31 absorbance units at 510 m$\mu$ and 1.18 absorbance units at 540 m$\mu$ upon chlorination.

EXAMPLE 3

Duplication of Example 2 except for carrying out the final fractional distillation at a pressure of 50 mm. of Hg absolute at the top of the column (D) and a pot temperature of 115–116° C., gave a product phenol which contained 8.5 p.p.m. of 2-MBF and had a color upon chlorination of 0.94 unit at 510 m$\mu$ and 0.81 at 540 m$\mu$.

EXAMPLE 4

Duplication of Example 1 except to use potassium hydroxide in place of sodium hydroxide and to add (at tank G) the potassium hydroxide to the condensate from the second column (B) in the distillation train, that is, to the crude phenol fraction which is fed to the column (C) in which the fractional steam distillation is carried out, gave an essentially equivalent final product phenol. The same was found to be true using calcium hydroxide as the base.

EXAMPLE 5

The procedure of Example 1 was followed, substituting various amines for the sodium hydroxide used. A commercial mixture of octadecylamine and octadecylamine acetate when added in an amount which was 2.0% based on the phenol treated gave a product phenol (146° C. pot temperature during final distillation) containing 18 p.p.m. of 2-MBF and having satisfactory color on chlorination. Also, the disalicylic acid salt of propylene diamine in 2.0% amount gave a product (145° C. pot temperature) having less than 8 p.p.m. 2-MBF. This same salt at 1.0% concentration resulted in a product (163° C. pot temperature) containing 8 p.p.m. 2-MBF. Ammonia also was used and found to produce a phenol product low in 2-MBF content and satisfactory in color upon chlorination.

EXAMPLE 6

The procedure of Example 1 was followed to the point where the crude phenol bottoms product from the steam distillation was obtained. This product then was stored in a steel container and, after an extended storage period, fractionally distilled to give a product phenol. Both the stored and product phenols contained several hundred parts per million of 2-MBF, formed by additional reaction of the alkyl-substituted benzofuran precursors with the phenol, and were unsatisfactory with respect to development of color upon chlorination.

Samples of these phenols were treated with sodium hydroxide as in Example 1, and the treated phenols were then subsequently efficiently fractionally steam distilled to remove 2-MBF as an overhead azeotrope with water. The bottoms from these distillations were subjected to fractional distillation, and the overhead product in each case had a color upon chlorination of about 1.5 absorbance units at both 510 and 540 m$\mu$.

EXAMPLE 7

To samples of substantially pure phenol (Merck) were added varying amounts of mesityl oxide, biacetyl and 2-methylbenzofuran (2-MBF), and the resulting mixture were chlorinated according to the chlorination test set forth hereinafter. A sample of the pure phenol was similarly chlorinated for comparative purposes. The data obtained are given in Table 1.

Table 1

| Sample | Color on Chlorination Absorbance | |
|---|---|---|
| | 510 m$\mu$ | 540 m$\mu$ |
| Phenol | 0.28 | 0.10 |
| Phenol+0.1% Mesityl Oxide | 1.2 | |
| Phenol+0.2% Mesityl Oxide | 2.8 | |
| Phenol+0.1% Biacetyl | 11.7 | |
| Phenol+0.016% 2-MBF | | 7.3 |
| Phenol+0.018% 2-MBF | | 9.7 |
| Phenol+0.022% 2-MBF | | 12.6 |
| Phenol+0.028% 2-MBF | | 14.8 |
| Phenol+0.034% 2-MBF | | 15.8 |
| Phenol+0.05% 2-MBF | | 22.8 |

The above data establish that each of the impurities has a profound effect on the color of chlorinated phenol. Both mesityl oxide and biacetyl cause a bright red coloration with a characteristic absorption at 510 m$\mu$. 2-methylbenzofuran is responsible for a reddish purple color with absorption at 540 m$\mu$, and it and biacetyl are relatively potent color-formers, imparting intense coloration in low concentrations. By comparison, mesityl oxide causes considerably less coloration.

The effect of applying the process of this invention to any particular batch of phenol may be followed by using the following color tests for determining whether the precursor-type and alkyl-substituted benzofuran genetic impurities have been removed. Biacetyl gives a red color when the phenol is subjected to chlorination in the chlorination color test and gives a reddish amber color when the phenol is sulfonated in the sulfonation color test. 2-methylbenzofuran gives a reddish purple color when the phenol is chlorinated in the chlorination color test.

*Chlorination color test.*—10±0.1 g. phenol to be tested is placed in a chlorination vessel comprising a 25 mm. test tube fitted with a gas inlet tube extending to the bottom of the test tube, a gas outlet tube opening from the upper end of the test tube, and a glass stopper for introduction of the phenol. Chlorine gas is introduced through the gas inlet tube at a rate of one liter per minute while maintaining a reaction temperature at 80°±5° C. by cooling of the chlorination vessel. The chlorination vessel is weighed from time to time and chlorination is stopped when a gain in weight of 5.5–6.0 grams is noted. The chlorinated product is then transferred to a 1 cm. cell and subjected to analysis by a recording spectrophotometer. The absorption at 510 and 540 m$\mu$ is noted for test purposes and the position of maximum absorption is also noted. Absorbance is a measurement of the intensity of absorption and is defined as the log of the reciprocal of the transmittance. The color of the chlorinated phenol in a 1 cm. cell is alternatively analyzed by Lovibond color units.

*Sulfonation color test.*—10±0.1 g. phenol to be tested is placed in a sulfonation vessel and heated until molten. To the phenol is added 5 g. of concentrated sulfuric acid, and the resulting mixture is heated with stirring to 150° C. and held at that temperature for 5 minutes. The sulfonated phenol is then cooled and transferred to a 1 cm. cell and subjected to analysis by a recording spectrophotometer. The absorption at 485 m$\mu$ is noted for test purposes.

The process of this invention involves three essential steps, two of which are distillations. An efficient fractional steam distillation is required to remove previously formed alkyl-substituted benzofurans from the phenol, and a final fractional distillation is needed to separate pure phenol from the products formed from the alkyl-substituted benzofuran precursors by treatment of the phenol with the basic reagent.

The treatment of the phenol material with a base is, of course, the third necessary step. The basic reagents are in general those alkaline materials which have an ionization constant greater than $8.6 \times 10^{-5}$ as measured at 25° C. Exemplary bases are the alkali metal hydroxides such as sodium hydroxide and potassium hydroxide, and the alkaline earth metal oxides and hydroxides such as lime, calcium hydroxide and barium hydroxide. Sodium and potassium carbonates are functionally equivalent to the hydroxides in the process of this invention when they are heated at elevated temperatures with the phenol. Additional operable bases are ammonia and organic amines such as methyl amine, dimethyl amine, trimethyl amine, ethyl amine, diethyl amine, triethyl amine, n-propyl amine, iso-propyl amine, dipropyl amine, tripropyl amine, n-butyl amine, iso-butyl amine, sec-butyl amine, tert-butyl amine, di-iso-butyl amine, tri-iso-butyl amine, iso-amyl amine, di-iso-amyl amine, diethyl methyl amine, phenyl propyl amine, phenyl butyl amine, phenyl amyl amine, benzylamine, ethanolamine, ethylene diamine, trimethylene diamine, tetramethylene diamine and piperidine.

All of these bases may be added to the phenol material to be treated either in anhydrous form or as an aqueous solution. From the standpoint of ease of handling, it is preferred to use the solid bases in aqueous solution. Sodium hydroxide, for example, is normally added in the form of a 10–50% solution in water. The amount of water is not critical since it does not enter into the reaction. Furthermore, there usually is a certain amount of water in the phenol until that point in the process where it is recovered from the final distillation step, and the only consideration with respect to water is therefore the amount which ultimately must be removed. From this standpoint, it is preferable to use a concentrated aqueous solution of the base, for example, 20–50% sodium hydroxide. It is also true that the concentration of the base in aqueous solution is not critical. The important point is that sufficient of the base, either anhydrous or in aqueous solution, be added to adjust the pH of the phenol material being treated, which normally has a pH of 3–4, to a value in the range of about 6.0 to about 8.5. Best results are obtained if the pH is at least 7.0, consequently a range of 7.0 to 8.5 is preferred. An amount of base necessary to give a pH greater than 8.5 is unnecessary.

Some of the operable amines are liquids and may conveniently be added in this form. On the other hand, those amines which are normally gaseous at ordinary temperature and pressure may more desirably be added to the phenol in the form of an aqueous solution. Also, as shown in Example 5, the amines may be used in the form of their salts with weak organic acids.

The temperature at which the treatment of the phenol material with the basic reagent is carried out depends to a great extent upon the ease with which the basic reagent promotes the conversion of the alkyl-substituted benzofuran precursors to products which are separable from phenol by distillation. The reaction involved is in the case of some of the precursors believed to be an aldol type of condensation, and some of the bases are more effective than others in this type of reaction and, consequently, may be used at lower temperatures. Also bearing on the temperature used is the length of time considered preferable to accomplish the desired result. In general, however, the temperature may vary from about 20° C. to about 250° C., preferably from about 50° C. to about 125° C. At the higher temperatures it may be necessary to keep the system under pressure, for example, 50–100 p.s.i. The minimum length of time to effect reaction is 0.25 hour but it ordinarily is true that considerably longer times are required with most of the basic reagents. Up to 100 hours and even more may be used, particularly if it is desired to store the treated phenol prior to the final fractional distillation. However, a period of about 1 to about 25 hours will usually suffice with a base such as sodium hydroxide.

The period of treatment with the basic reagent may be combined with the steam distillation step if desired, and in addition to removing alkyl-substituted benzofuran overhead as an azeotrope with water, it is possible to remove overhead those compounds formed by treatment of the precursors with a base and which per se or in the form of their water azeotropes have a lower boiling point than phenol. If the step of contacting the phenol material with the basic reagent precedes the steam distillation step, these low boiling compounds or water azeotropes are similarly distilled off during the steam distillation. The chief difference between conducting the treatment with base first and combining it with the steam distillation is that in the latter a longer period is normally required for removal of the overhead, in case complete removal at this stage is desired, since some of the compounds comprising the overhead are produced by the base-promoted reaction taking place during the steam distillation step. However, such compounds need not be completely removed in the overhead from the steam distillation, since they can be removed in the final fractional distillation, which will still be required to remove those compounds boiling higher than phenol and to remove, in most cases, the water present in the phenol. When the steam distillation step precedes that wherein the phenol is contacted with a base, the low boiling compounds formed in the latter are removed as overhead in the final fractional distillation.

The fractional steam distillation step of this invention must be operated with sufficient efficiency that the alkyl-substituted benzofurans such as 2-methylbenzofuran are substantially removed from the predominantly phenol-containing material. It is preferred that after the steam distillation the phenol-containing material will contain an amount of alkyl-substituted benzofuran corresponding to a content of 2-methylbenzofuran not exceeding about 50 parts per million, corresponding approximately to a chlorination color of about 3.0 at 540 m$\mu$. This can be accomplished by carrying out the distillation continuously in an efficient column, for example, one having 20–40 plates. Ordinary batch steam distillation is comparatively ineffective. If used prior to the step of treating the phenol with a basic reagent, the steam distillation can be operated to substantially remove mesityl oxide, as well is alkyl-substituted benzofuran.

The phenol-containing material from the steps of steam distillation and treatment with basic reagent is then subjected to fractional distillation in the absence of water other than that which may be present in the phenol. If low boiling compounds and water are present, they are removed as overhead, and pure, dry phenol is taken as a next overhead fraction or as a side stream, leaving as undistilled residue those compounds which are nonvolatile or have boiling points higher than phenol and which have been formed as a result of treatment of the phenol with the basic reagent. Moreover, it is possible that a complete separation of phenol and acetophenone did not occur earlier in the distillative recovery system, and the desired separation may accordingly be effected in the final fractional distillation step.

The final fractionation step is preferably carried out under reduced pressure, for example, 50–200 mm. of Hg absolute as measured at the top of the column. These pressures will permit pot temperatures not exceeding about 150–160° C., and such temperatures or lower are to be preferred because they reduce any tendency on the part of the compounds formed by treatment of the phenol with the basic reagent to revert to the alkyl-substituted benzofuran precursors and ultimately result in formation of additional alkyl-substituted benzofuran.

What we claim and desire to protect by Letters Patent is:

1. In the method for the recovery of phenol from a cumene hydroperoxide cleavage mixture by fractional distillation, said mixture comprising phenol and acetone as principal components, the improvement which comprises the steps of subjecting said mixture to fractional distillation to remove acetone and high boiling material composed primarily of acetophenone, dimethylphenylcarbinol and cumylphenol, and then subjecting any predominantly phenol-containing material which is substantially free of acetone and said high boiling material, but which contains genetic impurities comprising mesityl oxide, an alkyl-substituted benzofuran, and at least one precursor of said alkyl-substituted benzofuran, to the step of fractional steam distillation until the alkyl-substituted benzofuran has been substantially removed from said phenol-containing material, and to the step of contact in the liquid phase with a reagent consisting essentially of a material selected from the group consisting of a base and an aqueous solution thereof, said reagent being in an amount sufficient to adjust the pH of the phenol-containing material to a value in the range of about 6.0 to about 8.5 and being maintained in contact with said predominantly phenol-containing material at a temperature in the range of about 20° C. to about 250° C. for at least about 0.25 hour, whereby the precursor-type genetic impurity is substantially completely converted to a product which is separable from phenol by distillation, and finally to the step of fractional distillation to collect a purified phenol.

2. The method of claim 1 in which the fractional steam distillation is carried out prior to the step of contacting the predominantly phenol-containing material with the basic reagent.

3. The method of claim 1 in which the fractional steam distillation is carried out subsequent to the step of contacting the predominantly phenol-containing material with the basic reagent.

4. The method of claim 1 in which the fractional steam distillation is carried out simultaneously with the step of contacting the predominantly phenol-containing material with the basic reagent.

5. The process of claim 1 in which the base is sodium hydroxide.

6. The process of claim 1 in which the base is potassium hydroxide.

7. The process of claim 1 in which the base is calcium hydroxide.

8. The process of claim 1 in which the base is octadecylamine.

9. The process of claim 1 in which the base is the disalicylic acid salt of trimethylene diamine.

References Cited in the file of this patent

UNITED STATES PATENTS 2,737,480   Adams et al. _____ Mar. 6, 1956